United States Patent
Zou et al.

(10) Patent No.: US 12,418,448 B2
(45) Date of Patent: Sep. 16, 2025

(54) SIGNAL PROCESSING METHOD AND COMMUNICATION APPARATUS

(71) Applicant: HUAWEI TECHNOLOGIES CO., LTD., Shenzhen (CN)

(72) Inventors: Zhiqiang Zou, Shanghai (CN); Yanan Gao, Shanghai (CN); Xi Chen, Madrid (ES)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 18/476,059

(22) Filed: Sep. 27, 2023

(65) Prior Publication Data

US 2024/0022463 A1    Jan. 18, 2024

Related U.S. Application Data (63) Continuation of application No. PCT/CN2021/084182, filed on Mar. 30, 2021.

(51) Int. Cl.
*H04K 1/02* (2006.01)
*H04L 27/26* (2006.01)

(52) U.S. Cl.
CPC ................ *H04L 27/2623* (2013.01)

(58) Field of Classification Search
CPC .................................... H04L 27/2623
USPC ................. 375/296, 295, 219, 316
See application file for complete search history.

(56) References Cited

U.S. PATENT DOCUMENTS

| | | | |
|---|---|---|---|
| 2007/0089015 A1 | 4/2007 | Saul | |
| 2009/0168929 A1* | 7/2009 | Liu | H03G 3/345 |
| | | | 375/346 |
| 2018/0083820 A1* | 3/2018 | Agon | H04L 43/0847 |

FOREIGN PATENT DOCUMENTS

| EP | 2485447 A1 | 8/2012 |
|---|---|---|
| EP | 4236221 A1 | 8/2023 |

\* cited by examiner

*Primary Examiner* — Zewdu A Kassa
(74) *Attorney, Agent, or Firm* — Leydig, Voit & Mayer, Ltd.

(57) ABSTRACT

This application provides a signal processing method and a communication apparatus. The method includes: if it is detected that at least one signal feature of each carrier signal in a first combined signal changes, determining, based on the signal feature of each carrier signal, a first clipping noise power corresponding to each carrier signal; and performing clipping on each carrier signal based on the first clipping noise power corresponding to each carrier signal. The signal feature includes one or more of a power, a bandwidth, a frequency, a power spectral density, or a modulation scheme. According to this method, clipping processing is performed on each carrier signal, to reduce a PAPR in an OFDM system. In addition, when the signal feature of each carrier signal changes, an access network device may determine a clipping noise power of each carrier signal based on a changed signal feature of each carrier signal.

13 Claims, 5 Drawing Sheets

FIG. 1

```
If it is detected that at least one signal feature of each     S201
carrier signal in a first combined signal changes,
determine, based on the signal feature of each carrier
signal, a first clipping noise power corresponding to each
carrier signal
```

```
Perform clipping on each carrier signal based on the first    S202
clipping noise power corresponding to each carrier signal
```

SIGNAL PROCESSING METHOD AND COMMUNICATION APPARATUS

CROSS-REFERENCE TO RELATED APPLICATIONS

This application is a continuation of International Application No. PCT/CN2021/084182, filed on Mar. 30, 2021, the disclosure of which is hereby incorporated by reference in its entirety.

TECHNICAL FIELD

This application relates to the field of communication technologies, and in particular, to a signal processing method and a communication apparatus.

BACKGROUND

In orthogonal frequency division multiplexing (OFDM), carriers are orthogonal to each other, so that each carrier may have an integer quantity of carrier periods in one symbol time, and a spectrum zero point of each carrier overlaps a zero point of an adjacent carrier, to reduce interference between carriers. An OFDM symbol is formed by superposing a plurality of independently modulated carrier signals. When phases of carriers are the same or similar, the superposed signals are modulated by signals with a same initial phase, to generate a large instantaneous power peak value. Further, this results in a high peak to average power ratio (PAPR). Generally, a power amplifier has a limited dynamic range, and OFDM signals with a large PAPR are likely to enter a non-linear area of the power amplifier. Consequently, this causes non-linear distortion of the signals, obvious spectrum spreading interference and in-band signal distortion, and severe deterioration of entire system performance.

It can be learned that how to reduce a PAPR in an OFDM system to improve the system performance is an urgent problem to be resolved.

SUMMARY

This application provides a signal processing method and a communication apparatus. The method may be used to reduce a PAPR in an OFDM system, thereby reducing non-linear distortion of a signal and improving system performance.

According to a first aspect, this application provides a signal processing method. The method includes: if it is detected that at least one signal feature of each carrier signal in a first combined signal changes, determining, based on the signal feature of each carrier signal, a first clipping noise power corresponding to each carrier signal; and performing clipping on each carrier signal based on the first clipping noise power corresponding to each carrier signal. The signal feature includes one or more of a power, a bandwidth, a frequency, a power spectral density, or a modulation scheme.

According to the method in the first aspect, clipping processing is performed on each carrier signal, to reduce a PAPR in an OFDM system. In addition, when the signal feature of each carrier signal changes, an access network device may determine a clipping noise power of each carrier signal based on a changed signal feature of each carrier signal. In this way, the clipping noise power dynamically adapts to each carrier signal, thereby avoiding clipping missing and improving robustness of a system power amplifier.

In a possible implementation, a clipping weight corresponding to each carrier signal is determined based on the signal feature of each carrier signal in the first combined signal. The first clipping noise power corresponding to each carrier signal is determined based on the clipping weight corresponding to each carrier signal. With this possible implementation implemented, the signal feature of the carrier signal affects the clipping weight of the carrier signal, and further affects the clipping noise power of the carrier signal. In other words, it may be understood as that the clipping noise power of the carrier signal matches the signal feature of the carrier signal, to avoid clipping missing.

In a possible implementation, a second clipping noise power corresponding to each carrier signal is determined based on a preset signal threshold of the first combined signal. The clipping weight corresponding to each carrier signal is determined based on the second clipping noise power corresponding to each carrier signal and the power of each carrier signal. With this possible implementation implemented, the clipping weight of the carrier signal is determined based on a current power of the carrier signal, to improve accuracy of a determined clipping noise power.

In a possible implementation, clipping is performed on the first combined signal based on the preset signal threshold of the first combined signal, to obtain a second combined signal. The second combined signal is decomposed, to obtain a non-linear part of the second combined signal. Taylor expansion and Fourier transform are performed on the non-linear part of the second combined signal, to obtain a power spectral density of the non-linear part. Integration is performed on the power spectral density of the non-linear part based on the frequency of each carrier signal and the bandwidth of each carrier signal, to obtain the second clipping noise power corresponding to each carrier signal. With this possible implementation implemented, an unweighted clipping noise power (which may be understood as an original clipping noise power) corresponding to the carrier signal is jointly determined based on a plurality of signal features of the carrier signal, to improve accuracy of a determined unweighted clipping noise power.

In a possible implementation, the first clipping noise power corresponding to each carrier signal is determined based on the second clipping noise power of each carrier signal and the clipping weight corresponding to each carrier signal. With this possible implementation implemented, the clipping noise power of the carrier signal is determined based on both the original clipping noise power and the clipping weight, to improve accuracy of the clipping noise power of the carrier signal and adaptability between the clipping noise power and the carrier signal.

In a possible implementation, the signal feature includes the modulation scheme, and the signal feature further includes one or more of the power, the bandwidth, the frequency, or the power spectral density. The clipping weight corresponding to each carrier signal is determined based on a first signal feature of each carrier signal in the first combined signal. The first signal feature is one or more of the power, the bandwidth, the frequency, or the power spectral density. The clipping weight corresponding to each carrier signal is updated based on the modulation scheme of each carrier signal. An updated clipping weight of each carrier is negatively correlated with a modulation order of the modulation scheme of each carrier signal. With this possible implementation implemented, after the clipping weight is determined based on the power, the bandwidth, the frequency, or the power spectral density of the carrier signal, the clipping weight may be further adjusted based on the modulation scheme of the carrier signal. In this way, the access network device improves demodulation performance of a high-order modulated carrier while ensuring the adaptation between the clipping noise power and the carrier signal.

In a possible implementation, the signal feature includes the modulation scheme. A clipping weight of a first carrier signal and a clipping weight of a second carrier signal are determined. The clipping weight of the first carrier signal is less than the clipping weight of the second carrier signal. A modulation scheme of the first carrier signal is a first modulation scheme, and a modulation scheme of the second carrier signal is a second modulation scheme. A modulation order of the first modulation scheme is higher than a modulation order of the second modulation scheme. With this possible implementation implemented, the access network device determines the clipping weight of the carrier signal based on the modulation scheme of the carrier signal, so that clipping of the carrier signal modulated in a high-order modulation scheme is small, thereby improving the demodulation performance of the high-order modulated carrier.

According to a second aspect, a communication apparatus is provided. The apparatus may be a first communication device, an apparatus in the first communication device, or an apparatus that can be used together with the first communication device. Alternatively, the communication apparatus may be a chip system. The communication apparatus may perform the method in the first aspect. A function of the communication apparatus may be implemented by hardware, or may be implemented by hardware by executing corresponding software. The hardware or the software includes one or more units corresponding to the foregoing function. The unit may be software and/or hardware. For operations performed by the communication apparatus and beneficial effect, refer to the method in the first aspect and the beneficial effect of the first aspect. Repeated parts are not described again.

According to a third aspect, this application provides a communication apparatus. The communication apparatus includes a processor, and when the processor invokes a computer program in a memory, the method performed by a first communication device in the method in the first aspect is performed.

According to a fourth aspect, this application provides a communication apparatus. The communication apparatus includes a processor and a memory. The memory is configured to store computer-executable instructions. The processor is configured to execute the computer-executable instructions stored in the memory, to enable the communication apparatus to perform the method performed by a first communication device in the method in the first aspect.

According to a fifth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory, to perform the method performed by a first communication device in the method in the first aspect.

According to a sixth aspect, this application provides a communication apparatus. The communication apparatus includes a processor and an interface circuit. The interface circuit is configured to receive computer-executable instructions and transmit the computer-executable instructions to the processor. The processor runs the computer-executable instructions to perform the method performed by a first communication device in the method in the first aspect.

According to a seventh aspect, this application provides a computer-readable storage medium. The computer-readable storage medium is configured to store computer-executable instructions, and when the computer-executable instructions are executed, the method performed by a first communication device in the method in the first aspect is implemented.

According to an eighth aspect, this application provides a computer program product including a computer program. When the computer program is executed, the method performed by a first communication device in the method in the first aspect is implemented.

According to a ninth aspect, this application provides a communication system. The communication system includes the communication apparatus in the second aspect, the third aspect, the fourth aspect, the fifth aspect, or the sixth aspect.

DESCRIPTION OF EMBODIMENTS

To make objectives, technical solutions, and advantages of this application clearer, the following further describes this application in detail with reference to the accompanying drawings.

In the specification, claims, and accompanying drawings of this application, terms "first", "second", and the like are intended to distinguish between different objects but do not indicate a particular order. In addition, terms "including" and "having" and any other variants thereof are intended to cover a non-exclusive inclusion. For example, a process, a method, a system, a product, or a device that includes a series of operations or units is not limited to listed operations or units, but optionally further includes an unlisted operation or unit, or optionally further includes another inherent operation or unit of the process, the method, the product, or the device.

An "embodiment" mentioned in this specification means that a specific feature, structure, or characteristic described with reference to the embodiment may be included in at least one embodiment of this application. A phrase shown in various locations in the specification may not necessarily mean a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (items)" means two, three, or more, and "and/or" is used to describe a correspondence relationship between corresponding objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

To better understand the solutions provided in this application, the following first describes a system architecture in this application.

The method provided in embodiments of this application may be applied to various communication systems, for example, an Internet of Things (IoT) system, a narrow band Internet of Things (NB-IoT) system, a long term evolution (LTE) system, a 5th generation (5G) communication system, an LTE-5G hybrid architecture, a 5G new radio (NR) system, and a new communication system emerging in future communication development.

Figure 1:
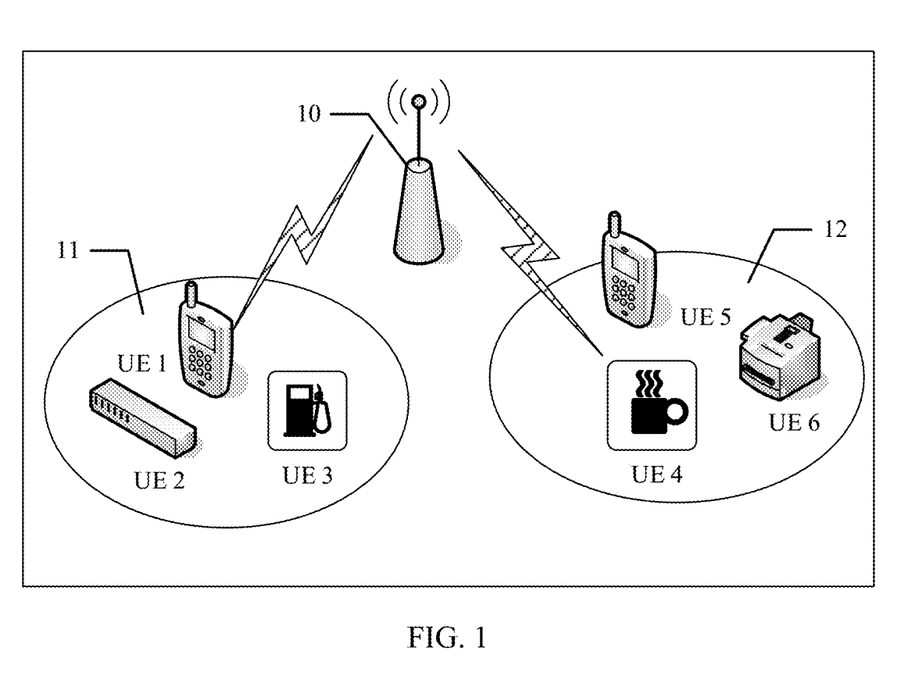
FIG. 1 is a schematic diagram of an application scenario of a signal processing method according to this application.

FIG. 1 is a schematic diagram of an application scenario of a signal processing method according to this application. In this application scenario, user equipment (UE) 1, UE 2, and UE 3 belong to a serving cell 11, and UE 4, UE 5, and UE 6 belong to a serving cell 12. An access network device ((radio) access network, (R)AN) 10 transmits data to UE in the serving cell 11 by using a carrier signal 1, and transmits data to UE in the serving cell 12 by using a carrier signal 2. The carrier signal 1 and the carrier signal 2 share a same radio frequency channel, that is, in the radio frequency channel, the carrier signal 1 and the carrier signal form a combined signal (which may be understood as that the combined signal includes the carrier signal 1 and the carrier signal 2).

It should be noted that an access network device mentioned in this application is an entity, namely, a node or a device that connects a terminal device to a wireless network, configured to transmit or receive a signal on a network side. For example, the access network device includes but is not limited to a new generation base station (generation NodeB, gNB) in a 5G communication system, an evolved NodeB (eNB), a next generation evolved NodeB (next generation eNB, ng-eNB), a wireless backhaul device, a radio network controller (RNC), a NodeB (NB), a base station controller (BSC), a base transceiver station (BTS), a home base station ((home evolved NodeB, HeNB) or (home NodeB, HNB)), a remote radio unit (RRU), a baseband unit (BBU), a transmission reception point (transmitting and receiving point, TRP), a transmission point (transmitting point, TP), and a mobile switching center. In this application, an access network device including an RRU and a BBU is merely used as an example for description, but is not limited thereto.

The following first describes related technical features in embodiments of this application. It should be noted that these explanations are intended to make embodiments of this application easier to understand, but should not be considered as a limitation on the protection scope claimed in this application.

A peak to average power ratio (PAPR) is a ratio between a peak power and an average power. The peak power may be understood as the instantaneous maximum output power of a signal. The average power is the average power of the signal.

Clipping (also referred to as peak clipping) means that a clipping threshold (also referred to as a preset signal threshold in the following) is set for a signal to suppress a peak value of an original signal. The clipping threshold may be understood as a clipping amplitude threshold or a clipping power threshold. A difference between the original signal and the clipping threshold is referred to as a clipping noise power, that is, the clipping noise power may be understood as a part of the original signal that is clipped by the clipping threshold.

Based on descriptions of the foregoing related features, to reduce the PAPR in an OFDM system, a clipping algorithm may be designed on an intermediate frequency side of a transmitter, to reduce a peak amplitude of the original signal, thereby reducing a PAPR in an OFDM system. A principle of reducing the PAPR by using the clipping algorithm is as follows: When a modulus value (namely, a signal amplitude value) of a carrier signal is greater than a preset modulus value threshold, the modulus value of the carrier signal is updated to the preset modulus value threshold; or when the modulus value of the carrier signal is less than the preset modulus value threshold, the modulus value of the carrier signal remains unchanged. However, although the PAPR in the OFDM system is reduced by using this method, when an inter-carrier signal feature changes dynamically, this method results in mismatch between the carrier signal and clipping noise (a difference between the amplitude value of the carrier signal and the preset modulus value threshold). Consequently, clipping is missed and robustness of the system is affected.

In view of this, this application provides a signal processing method, to determine the clipping noise power of each carrier signal based on a current signal feature of each carrier signal. In this way, a determined clipping noise power dynamically adapts to each carrier signal, thereby reducing the PAPR in the OFDM system and avoiding clipping missing, and improving the robustness of a system power amplifier.

The following describes in detail the signal processing method provided in this embodiment of this application.

Figure 2:
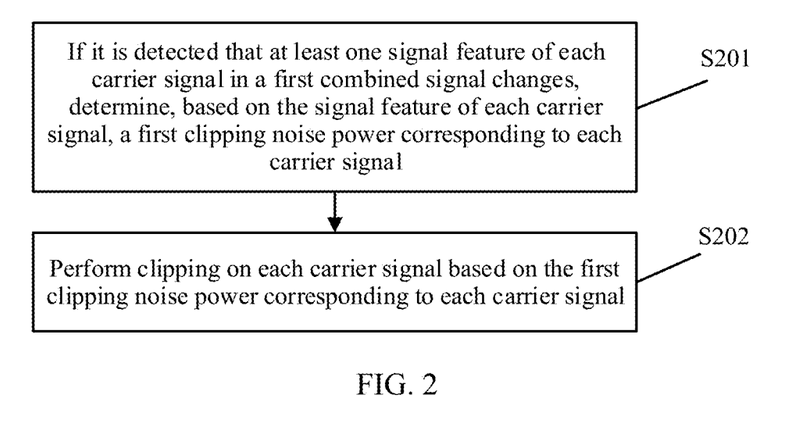
FIG. 2 is a schematic flowchart of a signal processing method according to this application.

FIG. 2 is a schematic flowchart of a signal processing method according to this application. As shown in FIG. 2, the signal processing method includes S201 and S202. The method shown in FIG. 2 may be performed by an access network device, or may be performed by a chip of the access network device. In FIG. 2, an example in which the method is performed by the access network device is used for description. Execution bodies of the signal processing method shown in other accompanying drawings in embodiments of this application are similar to what are described herein. Details are not described below again.

S201: If it is detected that at least one signal feature of each carrier signal in a first combined signal changes, determine, based on the signal feature of each carrier signal, a first clipping noise power corresponding to each carrier signal.

Figure 3A:
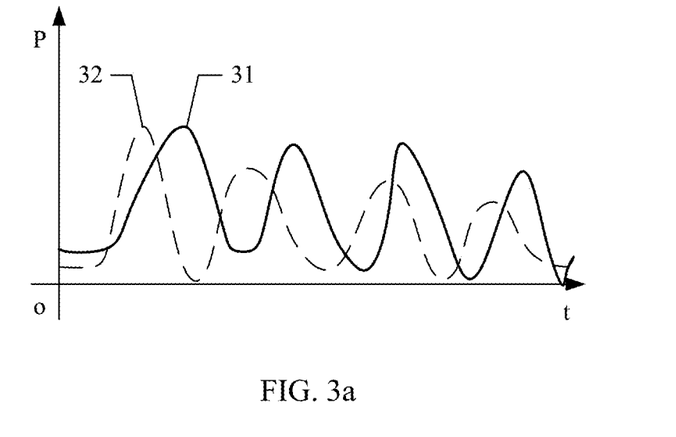
FIG. 3a is a schematic diagram of a time-domain signal diagram of a combined signal S according to this application.
Figure 3B:
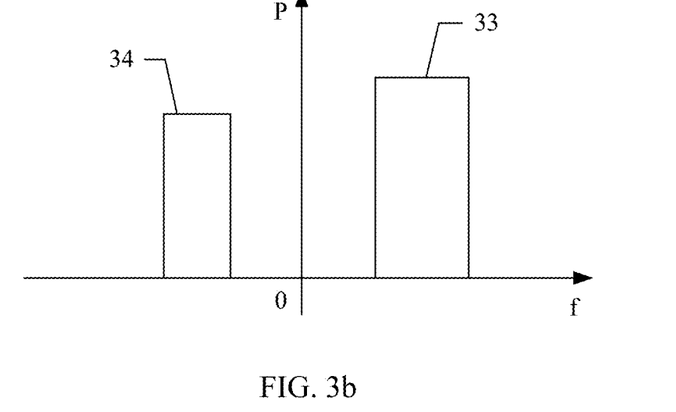
FIG. 3b is a schematic diagram of a frequency-domain signal diagram of a combined signal S according to this application.

The signal feature includes but is not limited to one or more of the following features: a power, a bandwidth, a frequency, a power spectral density, or a modulation scheme. The first combined signal is an original combined signal sent by the access network device, may be understood as an unclipped signal, and includes a plurality of carrier signals (which may alternatively be understood as that a combined signal includes a plurality of carrier signals). For example, a combined signal S includes two carrier signals: a carrier signal S1 and a carrier signal S2. For example, the combined signal is decomposed in time domain and frequency domain. FIG. 3a is a time-domain signal diagram of the combined signal S. A curve 31 is the carrier signal S1, and a curve 32 is the carrier signal S2. FIG. 3b is a frequency-domain signal diagram of the combined signal S. A region 33 is the carrier signal S1, and a region 34 is the carrier signal S2.

The access network device detects the signal feature of each carrier signal in the first combined signal. If it is detected that a signal feature of any carrier signal in the first combined signal changes, the access network device determines, based on the signal feature of each carrier signal in the combined signal, the first clipping noise power corresponding to each carrier signal. It should be noted that the access network device may detect the signal feature of each carrier signal in the first combined signal in a continuous manner, or may perform periodical detection based on a time value. This is not specifically limited in this application.

For example, the first combined signal S includes the carrier signal S1 and the carrier signal S2. The access network device detects a signal feature of the carrier signal S1 and a signal feature of the carrier signal S2. At a detection moment before the access network device detects the signal feature of each carrier signal, the signal feature of the carrier signal S1 includes: a power P1, a bandwidth D1, a frequency H1, a power spectral density R1, and a modulation scheme Q1. The signal feature of the carrier signal S2 includes: a power P2, a bandwidth D2, a frequency H2, a power spectral density R2, and a modulation scheme Q2. In this case, the access network device determines, based on the signal feature of the carrier signal S1 and the signal feature of the carrier signal S2, that a first clipping noise power of the carrier signal S1 is N1 and that a first clipping noise power of the carrier signal S2 is N2. At a current detection moment, if the access network device detects that a power spectral density of the carrier signal S1 changes from the power spectral density R1 to a power spectral density R1', the access network device determines, based on the signal feature (namely, the power P1, the bandwidth D1, the frequency H1, the power spectral density R1', and the modulation scheme Q1) of the carrier signal S1 and the signal feature (namely, the power P2, the bandwidth D2, the frequency H2, the power spectral density R2, and the modulation scheme Q2) of the carrier signal S2, a first clipping noise power N1' corresponding to the carrier signal S1 and a second clipping noise power N2' corresponding to the carrier signal S2.

S202: Perform clipping on each carrier signal based on the first clipping noise power corresponding to each carrier signal.

Figure 4:
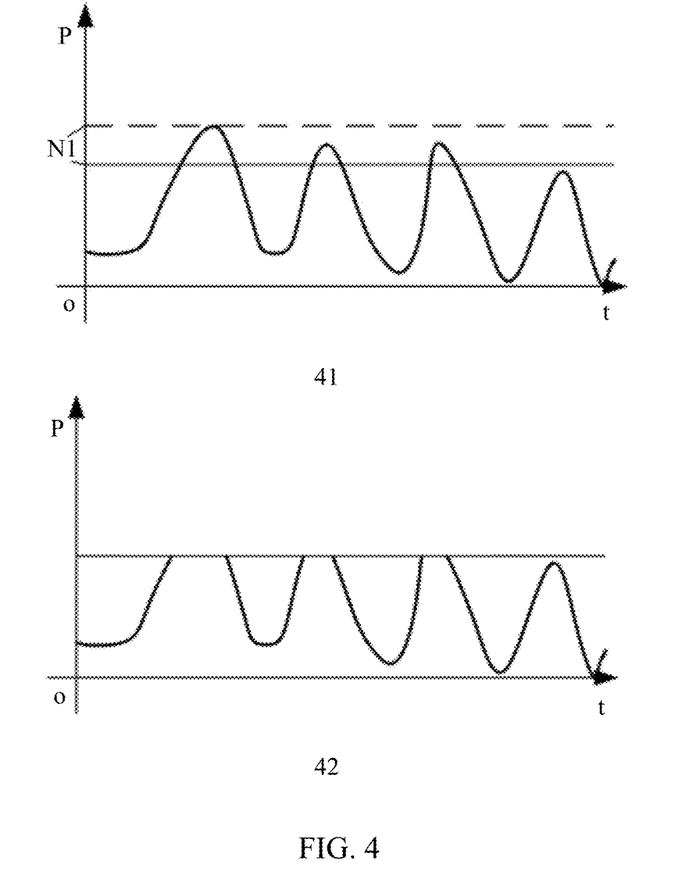
FIG. 4 is a schematic diagram of performing clipping on a carrier signal according to this application.

For each carrier signal, the access network device performs clipping on the carrier signal based on the first clipping noise power corresponding to the carrier signal. For example, the first clipping noise power corresponding to the carrier signal S1 is N1. FIG. 4 is a schematic diagram of performing clipping on a carrier signal according to this application. In FIG. 4, a module 41 is the carrier signal S1 before clipping, and a module 42 is the carrier signal S1 that is clipped based on the first clipping noise power N1.

According to the foregoing method, it can be learned that, performing clipping on each carrier signal based on clipping noise power corresponding to each carrier signal can effectively reduce a PAPR in a system, and improve system performance. In addition, the clipping noise power of each carrier signal is determined based on the signal feature of the carrier signal at a current moment. In other words, if any signal feature of the carrier signal changes, the clipping noise power of each carrier signal also changes, so that the clipping noise power of the carrier signal is adapted to the carrier signal, to avoid clipping missing and improve the robustness of the system power amplifier.

Based on FIG. 2, the following describes in detail a method for determining, based on a signal feature of each carrier signal, a first clipping noise power corresponding to each carrier signal.

Figure 5:
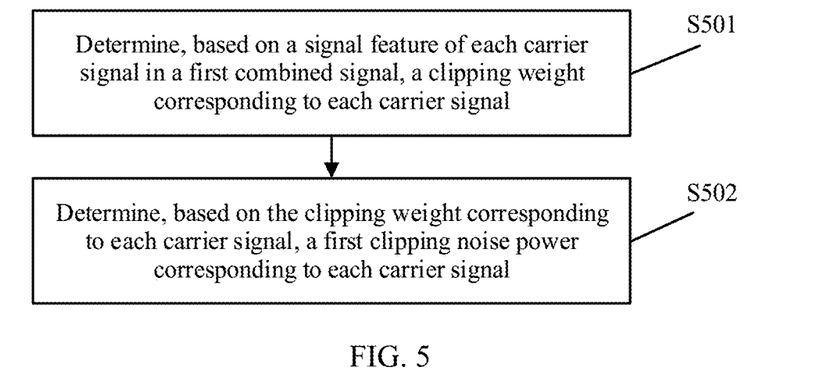
FIG. 5 is a schematic flowchart of a method for determining a first clipping noise power corresponding to each carrier according to this application.

FIG. 5 is a schematic flowchart of a method for determining a first clipping noise power corresponding to each carrier according to this application. As shown in FIG. 5, the method for determining the first clipping noise power corresponding to each carrier includes S501 and S502. The method shown in FIG. 5 may be performed by an access network device, or may be performed by a chip of an access network device. In FIG. 5, the example in which the method is performed by the access network device is used for description.

S501: Determine, based on a signal feature of each carrier signal in a first combined signal, a clipping weight corresponding to each carrier signal.

The clipping weight corresponding to each carrier signal is determined based on the signal feature of each carrier signal. For diversity of signal feature combinations, manners of determining the clipping weight of each carrier signal are also slightly different. The following describes in detail a manner of determining the clipping weight of each carrier signal based on the diversity of signal feature combinations.

Manner 1: The signal feature includes one or more of a power, a bandwidth, a frequency, or a power spectral density.

In this case, the access network device determines, based on a preset signal threshold of the first combined signal, a second clipping noise power corresponding to each carrier signal. Further, the access network device determines, based on the second clipping noise power corresponding to each carrier signal and the power of each carrier signal, the clipping weight corresponding to each carrier signal. The preset signal threshold may be correspondingly adjusted based on a specific application scenario. A specific value of the preset signal threshold is not specifically limited in this application.

The access network device determines, based on the preset signal threshold of the first combined signal, the second clipping noise power corresponding to each carrier signal. Further, the access network device may determine, based on a ratio between powers of carrier signals and a ratio between second clipping noise powers corresponding to the carrier signals, the clipping weight corresponding to each carrier signal. For example, the first combined signal includes the carrier signal S1 and the carrier signal S2. A power of the carrier signal S1 is P1, and a second clipping noise power of the carrier signal S1 is N1. A power of the carrier signal S2 is P2, and a second clipping noise power of the carrier signal S1 is N2. If a ratio between P1 and P2 is 10:1, and a ratio between N1 and N2 is 5:1, to ensure that deterioration degrees of the carrier signals are the same, even if a clipping noise power corresponding to each power of the carrier signal S1 is the same as a clipping noise power corresponding to each power of the carrier signal S2, a ratio between a clipping weight W1 corresponding to the carrier signal S1 and a clipping weight W2 corresponding to the carrier signal S2 is determined to be 2:1. In other words, to ensure that the deterioration degrees of the carrier signals are the same, a ratio between products of the second clipping noise powers corresponding to the carrier signals and clipping weights corresponding to the carrier signals needs to be the same as a ratio between the powers of the carrier signals.

The following describes in detail a specific process in which the access network device calculates the second clipping noise power of each carrier signal.

Step 1

The access network device performs clipping on the first combined signal based on the preset signal threshold of the first combined signal, to obtain a second combined signal, and decomposes the second combined signal, to obtain a non-linear part of the second combined signal, as shown in Formula (1).

$$S_0(t) = \alpha S(t) + n_d(t) \tag{1}$$

$S_0(t)$ is the second combined signal, namely, an output signal obtained after the first combined signal S is clipped based on the preset signal threshold. $\alpha S(t)$ is a linear part obtained after the second combined signal $S_0(t)$ is decomposed. $n_d(t)$ is the non-linear part obtained after the second combined signal $S_0(t)$ is decomposed.

Step 2

The access network device performs Taylor expansion on the non-linear part of the second combined signal, which may be understood as Taylor expansion is performed on an autocorrelation function of the second combined signal. Specifically, the autocorrelation function of the second combined signal is calculated, and Taylor expansion is performed on the autocorrelation function, to obtain Formula (2).

$$R_{S_0 S_0}(\tau) = c_0 [R_{SS}(\tau)] + \sum_{n=1}^{\infty} c_n [R_{SS}(\tau)]^{2n+1} \tag{2}$$

$R_{S_0 S_0}(\tau)$ is a formula obtained by performing Taylor expansion on the autocorrelation function of the second combined signal. $c_0 [R_{SS}(\tau)]$ is a formula obtained by performing Taylor expansion on an autocorrelation function of the linear part $\alpha S(t)$ in Formula (1).

$$\sum_{n=1}^{\infty} c_n [R_{SS}(\tau)]^{2n+1}$$

is a formula obtained by performing Taylor expansion on an autocorrelation function of the non-linear part $n_d(t)$ in Formula (1).

Step 3

Fourier transform is performed on the non-linear part (namely, $$\sum_{n=1}^{\infty} c_n [R_{SS}(\tau)]^{2n+1}$$

in Formula (2)) of the second combined signal obtained after Taylor expansion, to obtain a power spectral density of the non-linear part. Specifically, Fourier transform is performed on the second combined signal obtained after Taylor expansion, to obtain Formula (3).

$$S_{S_0 S_0}(f) = c_0 [S_{SS}(f)] + \sum_{n=1}^{\infty} c_n [S_{SS}(f) \otimes L \otimes S_{SS}(f)] \tag{3}$$

$S_{S_0 S_0}(f)$ is a formula obtained by performing Fourier transform on the second combined signal (namely, $R_{S_0 S_0}(\tau)$ in Formula (2)). $c_0 [S_{SS}(f)]$ is a formula obtained by performing Fourier transform on the linear part (namely, $c_0 [R_{SS}(\tau)]$ in Formula (2)) of the second combined signal.

$$\sum_{n=1}^{\infty} c_n [S_{SS}(f) \otimes L \otimes S_{SS}(f)]$$

is a formula obtained by performing Taylor expansion on the non-linear part (namely, $$\sum_{n=1}^{\infty} c_n [R_{SS}(\tau)]^{2n+1}$$

in Formula (2)) of the second combined signal. A quantity of $$S_{ss}(f) \text{ in } \sum_{n=1}^{\infty} c_n [S_{SS}(f) \otimes L \otimes S_{SS}(f)] 2n + 1.$$

Step 4

Integration is performed on the power spectral density of the non-linear part based on the frequency of each carrier signal and the bandwidth of each carrier signal, to obtain the second clipping noise power corresponding to each carrier signal. For example, the first combined signal S includes the carrier signal S1 and the carrier signal S2. In this case, the access network device performs integration on $$\sum_{n=1}^{\infty} c_n [S_{SS}(f) \otimes L \otimes S_{SS}(f)]$$

in Formula (3) based on a frequency H1 of the carrier signal S1 and a bandwidth D1 of the carrier signal S1, to obtain a second clipping noise power corresponding to the carrier signal S1. The access network device performs integration on $$\sum_{n=1}^{\infty} c_n [S_{SS}(f) \otimes L \otimes S_{SS}(f)]$$

in Formula (3) based on a frequency H2 of the carrier signal S2 and a bandwidth D2 of the carrier signal S2, to obtain a second clipping noise power corresponding to the carrier signal S2.

Figure 6A:
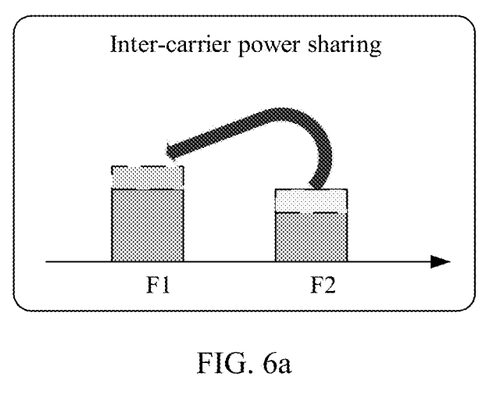
FIG. 6a is a schematic diagram of an application scenario of a signal processing method according to this application.

FIG. 6a is an application scenario of a signal processing method according to this application. In this scenario, a combined signal includes two carrier signals: a carrier signal F1 (a power is P1) and a carrier signal F2 (a power is P2). The access network device performs dynamic configuration on each carrier signal, for example, sharing a part of power originally belonging to the carrier signal F2 with the carrier signal F1, which may be understood as that the carrier signal F2 lends the part of power to the carrier signal F1 for use. As a result, a ratio between a power of the carrier signal F1 (which is changed to P2', where P2' is less than P2) and a power of the carrier signal F2 (which is changed to P1', where P1' is greater than P1) changes. In this application scenario, the method described in Implementation 1 may be used to determine a clipping weight of each carrier signal based on a signal feature of each current carrier signal.

Figure 6B:
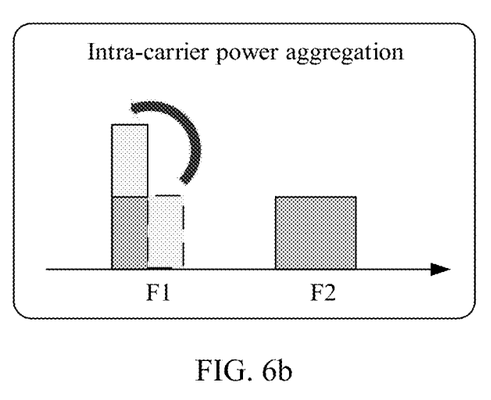
FIG. 6b is a schematic diagram of another application scenario of a signal processing method according to this application.

FIG. 6b is another application scenario of a signal processing method according to this application. In this scenario, a combined signal includes two carrier signals: a carrier signal F1 (a power is P1) and a carrier signal F2 (a power is P2). To improve signal coverage of the carrier signal F1, the access network device lends some unscheduled resource blocks (resource block, RB) in the carrier signal F1 to another RB in the carrier signal F1 for use (which may be understood as that intra-carrier power aggregation occurs in the carrier signal F1). As a result, a power spectral density of the carrier signal F1 becomes larger, and further, a ratio between the power spectral density of the carrier signal F1 and a power spectral density of the carrier signal F2 changes. In this application scenario, the method described in Implementation 1 may be used to determine a clipping weight of each carrier signal based on a signal feature of each current carrier signal.

Manner 2: The signal feature includes a modulation scheme.

In this case, the access network device determines a clipping weight of a first carrier signal and a clipping weight of a second carrier signal based on the modulation scheme of each carrier signal. The clipping weight of the first carrier signal is less than the clipping weight of the second carrier signal. A modulation scheme of the first carrier signal is a first modulation scheme, and a modulation scheme of the second carrier signal is a second modulation scheme. A modulation order of the first modulation scheme is higher than a modulation order of the second modulation scheme.

According to a communication protocol indicator, a modulation scheme with a low modulation order (which is referred to as a low-order modulation for short in the following) can tolerate a larger error vector magnitude (EVM). In other words, a modulation scheme with a higher modulation order (which is referred to as a high-order modulation for short in the following) can tolerate a smaller ENM. Specifically, refer to Table 1. Table 1 is a correspondence table between a modulation scheme and an EVM tolerance. An EVM tolerance corresponding to quadrature phase shift keying (QPSK) is 17.5%. An EVM tolerance corresponding to 16 quadrature amplitude modulation (QAM) is 12.5%. An EVM tolerance corresponding to 64 QAM is 8.0%. An EVM tolerance corresponding to 256 QAM is 3.5%.

TABLE 1

| Modulation scheme | EVM tolerance |
|---|---|
| QPSK | 17.5% |
| 16QAM | 12.5% |
| 64QAM | 8.0% |
| 256QAM | 3.5% |

To improve demodulation performance of a carrier signal using a high-order modulation scheme, the access network device may determine the clipping weight of each carrier signal based on the modulation scheme of each carrier signal. In other words, a clipping weight of a high-order modulated carrier signal is less than a clipping weight of a low-order modulated carrier signal.

Manner 3: The signal feature includes a modulation scheme and a first signal feature. The first signal feature includes one or more of a power, a bandwidth, a frequency, or a power spectral density.

In this case, the access network device determines, based on the first signal feature of each carrier signal in the first combined signal, the clipping weight corresponding to each carrier signal. Further, the access network device updates, based on the modulation scheme of each carrier signal, the clipping weight corresponding to each carrier signal. An updated clipping weight of each carrier is negatively correlated with a modulation order of the modulation scheme of each carrier signal.

In other words, when the signal feature includes the modulation scheme, and further includes the first signal feature (the power, the bandwidth, the frequency, or the power spectral density), the access network device may determine, based on the first signal feature (one or more of the power, the bandwidth, the frequency, or the power spectral density) of each carrier signal by using a specific implementation in Manner 1, the clipping weight corresponding to each carrier signal. Further, to improve demodulation performance of a high-order modulated carrier, the access network device adjusts the clipping weight of each carrier signal based on the modulation scheme of each carrier signal, to be specific, a clipping weight corresponding to a high-order modulated carrier signal is reduced, so that the clipping weight of the high-order modulated carrier signal is less than a clipping weight of a low-order modulated carrier signal.

Figure 6C:
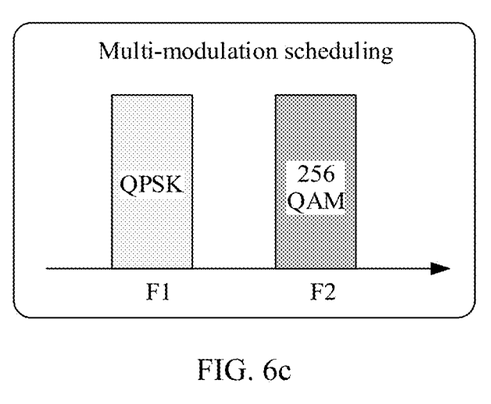
FIG. 6c is a schematic diagram of still another application scenario of a signal processing method according to this application.

FIG. 6c is still another application scenario of a signal processing method according to this application. In this scenario, a combined signal includes two carrier signals: a carrier signal F1 (a modulation scheme is QPSK) and a carrier signal F2 (a modulation scheme is 256QAM). To improve the demodulation performance of the high-order modulated carrier, that is, to improve demodulation performance of the carrier signal F2 modulated by using 256QAM, Manner 2 or Manner 3 may be used to determine a clipping weight of the carrier signal F1 and a clipping weight of the carrier signal F2 in this application scenario.

S502: Determine, based on the clipping weight corresponding to each carrier signal, the first clipping noise power corresponding to each carrier signal.

The access network device determines, based on the second clipping noise power of each carrier signal and the clipping weight corresponding to each carrier signal, the first clipping noise power corresponding to each carrier signal. In other words, it may be understood as that a first clipping noise power of a carrier signal is a product of a clipping weight corresponding to the carrier signal and a second clipping noise power of the carrier signal.

Figure 7:
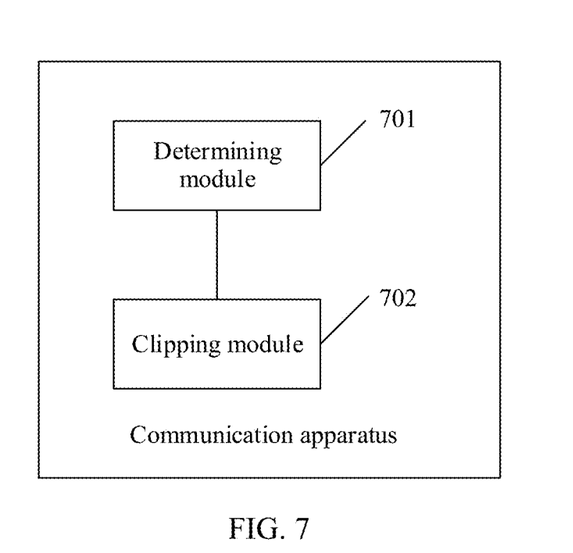
FIG. 7 is a schematic diagram of a structure of a communication apparatus according to this application.

FIG. 7 is a schematic diagram of a structure of a communication apparatus according to an embodiment of this application. The communication apparatus shown in FIG. 7 may be configured to implement some or all functions of the access network device in embodiments corresponding to the foregoing signal processing method. The communication apparatus shown in FIG. 7 may be configured to implement some or all functions of the access network device in the method embodiments described in FIG. 2 and FIG. 5. The apparatus may be the access network device, an apparatus in the access network device, or an apparatus that can be used together with the access network device. Alternatively, the communication apparatus may be a chip system. The communication apparatus shown in FIG. 7 may include a determining module 701 and a clipping module 702. The determining module 701 may be a BBU, and the clipping module 702 may be an RRU or an active antenna unit (active antenna unit, AAU).

The determining module 701 is configured to: if it is detected that at least one signal feature of each carrier signal in a first combined signal changes, determine, based on the signal feature of each carrier signal, a first clipping noise power corresponding to each carrier signal. The clipping module 702 is configured to perform clipping on each carrier signal based on the first clipping noise power corresponding to each carrier signal. The signal feature includes one or more of a power, a bandwidth, a frequency, a power spectral density, or a modulation scheme.

In a possible implementation, the determining module 701 is specifically configured to: determine, based on the signal feature of each carrier signal in the first combined signal, a clipping weight corresponding to each carrier signal; and determine, based on the clipping weight corresponding to each carrier signal, the first clipping noise power corresponding to each carrier signal.

In a possible implementation, the determining module 701 is specifically configured to: determine, based on a preset signal threshold of the first combined signal, a second clipping noise power corresponding to each carrier signal; and determine, based on the second clipping noise power corresponding to each carrier signal and the power of each carrier signal, the clipping weight corresponding to each carrier signal.

In a possible implementation, the determining module 701 is specifically configured to: perform clipping on the first combined signal based on the preset signal threshold of the first combined signal, to obtain a second combined signal; decompose the second combined signal, to obtain a non-linear part of the second combined signal; perform Taylor expansion and Fourier transform on the non-linear part of the second combined signal, to obtain a power spectral density of the non-linear part; and perform integration on the power spectral density of the non-linear part based on the frequency of each carrier signal and the bandwidth of each carrier signal, to obtain the second clipping noise power corresponding to each carrier signal.

In a possible implementation, the determining module 701 is specifically configured to determine, based on the second clipping noise power of each carrier signal and the clipping weight corresponding to each carrier signal, the first clipping noise power corresponding to each carrier signal.

In a possible implementation, the signal feature includes the modulation scheme and a first signal feature, and the first signal feature further includes one or more of the power, the bandwidth, the frequency, or the power spectral density. The determining module 701 is specifically configured to: determine, based on the first signal feature of each carrier signal in the first combined signal, the clipping weight corresponding to each carrier signal; and update, based on the modulation scheme of each carrier signal, the clipping weight corresponding to each carrier signal. An updated clipping weight of each carrier is negatively correlated with a modulation order of the modulation scheme of each carrier signal.

In a possible implementation, the signal feature includes the modulation scheme. The determining module 701 is specifically configured to: determine a clipping weight of a first carrier signal and a clipping weight of a second carrier signal based on the modulation scheme of each carrier signal. The clipping weight of the first carrier signal is less than the clipping weight of the second carrier signal. A modulation scheme of the first carrier signal is a first modulation scheme, and a modulation scheme of the second carrier signal is a second modulation scheme. A modulation order of the first modulation scheme is higher than a modulation order of the second modulation scheme.

Figure 8:
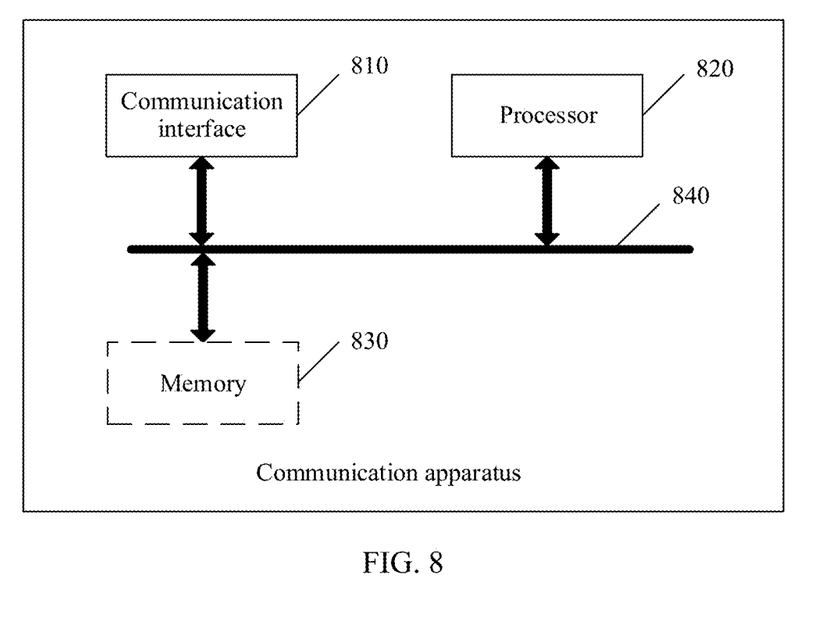
FIG. 8 is a schematic diagram of a structure of another communication apparatus according to an embodiment of this application.

FIG. 8 shows a communication apparatus 80 provided in an embodiment of this application. The communication apparatus 80 is configured to implement a function of the access network device in the foregoing signal processing method. The apparatus may be an apparatus of the access network device. The apparatus used in the access network device may be a chip system or a chip in the access network device. The chip system may include the chip, or may include the chip and another discrete device.

The communication apparatus 80 includes at least one processor 820, configured to implement a data processing function of the access network device in the method provided in embodiments of this application. The apparatus 80 may also include a communication interface 810, configured to implement sending and receiving operations of the access network device in the method provided in embodiments of this application. In this embodiment of this application, the communication interface may be a transceiver, a circuit, a bus, a module, or another type of communication interface, and is configured to communicate with another device through a transmission medium. For example, the communication interface 810 is used by an apparatus in the apparatus 80 to communicate with another device. The processor 820 receives and sends data through the communication interface 810, and is configured to implement the method in the foregoing method embodiments.

The apparatus 80 may further include at least one memory 830, configured to store program instructions and/or data. The memory 830 is coupled to the processor 820. Coupling in this embodiment of this application may be indirect coupling or a communication connection between apparatuses, units, or modules in an electrical form, a mechanical form, or another form, and is used for information exchange between the apparatuses, the units, or the modules. The processor 820 may cooperate with the memory 830. The processor 820 may execute the program instructions stored in the memory 830. At least one of the at least one memory may be included in the processor.

This embodiment of this application does not limit a specific connection medium between the communication interface 810, the processor 820, and the memory 830. In this embodiment of this application, the memory 830, the processor 820, and the communication interface 810 are connected by using a bus 840 in FIG. 8. The bus is represented by a bold line in FIG. 8. A connection manner between other components is merely schematically described, and imposes no limitation. The bus may be classified into an address bus, a data bus, a control bus, and the like. For ease of representation, only one thick line is used to represent the bus in FIG. 8, but this does not mean that there is only one bus or only one type of bus.

When the apparatus 80 is specifically an apparatus used in the access network device, for example, when the apparatus 80 is specifically the chip or the chip system, the communication interface 810 may output or receive a baseband signal. When the apparatus 80 is specifically the access network device, the communication interface 810 may output or receive a radio frequency signal. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform methods, steps, and logical block diagrams disclosed in embodiments of this application. The general-purpose processor may be a microprocessor or any conventional processor or the like. The steps of the methods disclosed with reference to embodiments of this application may be directly performed by a hardware processor, or may be performed by using a combination of hardware in the processor and a software module.

An embodiment of this application further provides a computer-readable storage medium. The computer-readable storage medium stores computer-executable instructions. When the computer-executable instructions are executed, the method performed by the access network device in the foregoing method embodiments is implemented.

An embodiment of this application further provides a computer program product. The computer program product includes a computer program. When the computer program is executed, the method performed by the access network device in the foregoing method embodiments is implemented.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease and brevity of description, for example, for functions and performed steps of the apparatuses and devices provided in embodiments of this application, refer to related descriptions of the method embodiments of this application. The method embodiments and the apparatus embodiments may also be referenced, combined, or cited to each other.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A signal processing method, wherein the method comprises:
   detecting whether at least one signal feature of each carrier signal in a first combined signal changes;
   when it is detected that at least one signal feature of each carrier signal in a first combined signal changes, determining, based on the signal feature of each carrier signal, a first clipping noise power corresponding to each carrier signal; and
   performing clipping on each carrier signal based on the first clipping noise power corresponding to each carrier signal, wherein
   the signal feature comprises one or more of a power, a bandwidth, a frequency, a power spectral density, or a modulation scheme, wherein the determining, based on the signal feature of each carrier signal, a first clipping noise power corresponding to each carrier signal comprises:
   determining, based on the signal feature of each carrier signal in the first combined signal, a clipping weight corresponding to each carrier signal; and
   determining, based on the clipping weight corresponding to each carrier signal, the first clipping noise power corresponding to each carrier signal.

2. The method according to claim 1, wherein the determining, based on the signal feature of each carrier signal in the first combined signal, a clipping weight corresponding to each carrier signal comprises:
   determining, based on a preset signal threshold of the first combined signal, a second clipping noise power corresponding to each carrier signal; and
   determining, based on the second clipping noise power corresponding to each carrier signal and the power of each carrier signal, the clipping weight corresponding to each carrier signal.

3. The method according to claim 2, wherein the determining, based on a preset signal threshold of the first combined signal, a second clipping noise power corresponding to each carrier signal comprises:
   performing clipping on the first combined signal based on the preset signal threshold of the first combined signal, to obtain a second combined signal;
   decomposing the second combined signal, to obtain a non-linear part of the second combined signal;
   performing Taylor expansion and Fourier transform on the non-linear part of the second combined signal, to obtain a power spectral density of the non-linear part; and
   performing integration on the power spectral density of the non-linear part based on the frequency of each carrier signal and the bandwidth of each carrier signal, to obtain the second clipping noise power corresponding to each carrier signal.

4. The method according to claim 2, wherein the determining, based on the clipping weight corresponding to each carrier signal, the first clipping noise power corresponding to each carrier signal comprises:
   determining, based on the second clipping noise power of each carrier signal and the clipping weight corresponding to each carrier signal, the first clipping noise power corresponding to each carrier signal.

5. The method according to claim 2, wherein the signal feature comprises the modulation scheme and a first signal feature, the first signal feature further comprises one or more of the power, the bandwidth, the frequency, or the power spectral density, and the determining, based on the signal feature of each carrier signal in the first combined signal, a clipping weight corresponding to each carrier signal comprises:
determining, based on the first signal feature of each carrier signal in the first combined signal, the clipping weight corresponding to each carrier signal; and
updating, based on the modulation scheme of each carrier signal, the clipping weight corresponding to each carrier signal, wherein an updated clipping weight of each carrier is negatively correlated with a modulation order of the modulation scheme of each carrier signal.

6. The method according to claim 1, wherein the signal feature comprises the modulation scheme, and the determining, based on the signal feature of each carrier signal in the first combined signal, a clipping weight corresponding to each carrier signal comprises:
determining a clipping weight of a first carrier signal and a clipping weight of a second carrier signal based on the modulation scheme of each carrier signal, wherein
the clipping weight of the first carrier signal is less than the clipping weight of the second carrier signal, a modulation scheme of the first carrier signal is a first modulation scheme, a modulation scheme of the second carrier signal is a second modulation scheme, and a modulation order of the first modulation scheme is higher than a modulation order of the second modulation scheme.

7. A communication apparatus, comprising at least one processor and a non-transitory memory coupled to the at least one processor and storing programming instructions for execution by the at least one processor, when executed by the at least one processor, cause the communication apparatus to:
detect whether at least one signal feature of each carrier signal in a first combined signal changes;
when it is detected that at least one signal feature of each carrier signal in a first combined signal changes, determine, based on the signal feature of each carrier signal, a first clipping noise power corresponding to each carrier signal; and
perform clipping on each carrier signal based on the first clipping noise power corresponding to each carrier signal, wherein
the signal feature comprises one or more of a power, a bandwidth, a frequency, a power spectral density, or a modulation scheme, wherein the instructions, when executed by the processor, cause the apparatus to determine, based on the signal feature of each carrier signal, a first clipping noise power corresponding to each carrier signal include instructions that cause the apparatus to:
determine, based on the signal feature of each carrier signal in the first combined signal, a clipping weight corresponding to each carrier signal; and
determine, based on the clipping weight corresponding to each carrier signal, the first clipping noise power corresponding to each carrier signal.

8. The apparatus according to claim 7, wherein the instructions, when executed by the processor, cause the apparatus to determine based on the signal feature of each carrier signal in the first combined signal, a clipping weight corresponding to each carrier signal include instructions that cause the apparatus to:
determine, based on a preset signal threshold of the first combined signal, a second clipping noise power corresponding to each carrier signal; and
determine, based on the second clipping noise power corresponding to each carrier signal and the power of each carrier signal, the clipping weight corresponding to each carrier signal.

9. The apparatus according to claim 8, wherein the instructions, when executed by the processor, cause the apparatus to determine based on a preset signal threshold of the first combined signal, a second clipping noise power corresponding to each carrier signal include instructions that cause the apparatus to
perform clipping on the first combined signal based on the preset signal threshold of the first combined signal, to obtain a second combined signal;
decompose the second combined signal, to obtain a non-linear part of the second combined signal;
perform Taylor expansion and Fourier transform on the non-linear part of the second combined signal, to obtain a power spectral density of the non-linear part; and
perform integration on the power spectral density of the non-linear part based on the frequency of each carrier signal and the bandwidth of each carrier signal, to obtain the second clipping noise power corresponding to each carrier signal.

10. The apparatus according to claim 8, wherein the instructions, when executed by the processor, cause the apparatus to determine based on the clipping weight corresponding to each carrier signal, the first clipping noise power corresponding to each carrier signal include instructions that cause the apparatus to
determine, based on the second clipping noise power of each carrier signal and the clipping weight corresponding to each carrier signal, the first clipping noise power corresponding to each carrier signal.

11. The apparatus according to claim 8, wherein the signal feature comprises the modulation scheme and a first signal feature, the first signal feature further comprises one or more of the power, the bandwidth, the frequency, or the power spectral density, and the instructions, when executed by the processor, cause the apparatus to determine based on the signal feature of each carrier signal in the first combined signal, a clipping weight corresponding to each carrier signal include instructions that cause the apparatus to:
determine, based on the first signal feature of each carrier signal in the first combined signal, the clipping weight corresponding to each carrier signal; and
update, based on the modulation scheme of each carrier signal, the clipping weight corresponding to each carrier signal, wherein an updated clipping weight of each carrier is negatively correlated with a modulation order of the modulation scheme of each carrier signal.

12. The apparatus according to claim 7, wherein the signal feature comprises the modulation scheme, and the instructions, when executed by the processor, cause the apparatus to determine based on the signal feature of each carrier signal in the first combined signal, a clipping weight corresponding to each carrier signal include instructions that cause the apparatus to: determine a clipping weight of a first carrier signal and a clipping weight of a second carrier signal based on the modulation scheme of each carrier signal, wherein the clipping weight of the first carrier signal is less than the clipping weight of the second carrier signal; a modulation scheme of the first carrier signal is a first modulation scheme, a modulation scheme of the second carrier signal is a second modulation scheme, and a modulation order of the first modulation scheme is higher than a modulation order of the second modulation scheme.

13. A non-transitory computer storage medium, wherein the computer storage medium is configured to store computer software instructions, and when the computer software instructions are executed, the method according to claim 1 is implemented.

* * * * *